Nov. 6, 1951 R. R. FREAS, JR 2,574,145

COINCIDENCE INDICATOR FOR ELECTRONIC COUNTERS

Filed April 29, 1948 3 Sheets-Sheet 1

INVENTOR
Robert R. Freas, Jr.
BY Morris Rabin
ATTORNEY

INVENTOR
Robert R. Freas, Jr.
BY Morris L. Rabkin
ATTORNEY

Nov. 6, 1951 R. R. FREAS, JR 2,574,145

COINCIDENCE INDICATOR FOR ELECTRONIC COUNTERS

Filed April 29, 1948 3 Sheets-Sheet 3

INVENTOR
Robert R. Freas, Jr.
BY Morris Rakin
ATTORNEY

UNITED STATES PATENT OFFICE 2,574,145

COINCIDENCE INDICATOR FOR ELECTRONIC COUNTERS

Robert Russell Freas, Jr., Jermyn, Pa., assignor to Radio Corporation of America, a corporation of Delaware Application April 29, 1948, Serial No. 23,896

2 Claims. (Cl. 235—92)

This invention relates to coincidence indicators for electronic counters which (1) include a plurality of stages connected in tandem and (2) are provided with count selector switches such that an output pulse may be produced in response to different selected numbers of input pulses applied to the first stage of the counter.

As is well known, each stage of the counter may include a pair of triodes which (1) have their cathodes grounded through a bias resistor shunted by a bypass capacitor, (2) have operating potential applied to their anodes through a common resistor and thence through separate resistors, (3) have their anodes each connected to the grid of the other through a resistor which is shunted by a capacitor, and (4) have bias potential applied to their grids through separate resistors.

In the operation of such a counter stage, current conduction is stable in one or the other of the anodes and is transferred from one to the other of the anodes in response to a negative input pulse applied to the junction between the common and separate anode resistors of the stage. As a result of the transfer of current conduction between the anodes, the anode which is conducting is at a relatively low potential while the nonconducting anode is at a relatively high potential.

When a number of such stages are connected in tandem, input pulses are applied to the common anode resistor terminal of the first stage, the following stages each has its common anode terminal coupled through a capacitor to driving anode of the immediately preceding stage, and the current conductive condition of the following stage is changed each time the driving anode of the preceding stage conducts current.

As is well known, the various stages of the counter may be arranged in groups which (1) each includes four stages having feedback connections between the driven anode of the third stage and the grid associated with driving anode of the second stage and between the driven anode of the fourth stage and the grid associated with the driving anode of the third stage, and (2) each completes its operating cycle in response to the application of ten input pulses so that one pulse is applied from a preceding group of stages or decade to the immediately following decade for every ten pulses applied to such preceding stage.

As disclosed by a copending application of W. H. Bliss, Serial Number 736,214, filed March 21, 1947, now Patent No. 2,521,774, issued September 12, 1950, each of the decades may be provided with a count selector switch having three rows of fixed contacts which are each connected to a different anode of the decade and are so arranged that any count of the decade from 0 to 9 may be selected by three interconnected contacts which are moved simultaneously to engage successive fixed contacts of the different horizontal rows. The count selector switches of the different decades are provided with a common output circuit which functions to produce one output pulse in response to a number of counter input pulses predetermined by the settings of the count selector switches of the different decades of the counter.

The potential applied from the count selector switches of the different decades to the common output circuit is of the multi-level pedestal type wherein the duration of the lowest level is determined by the interval between the pulses of the highest order decade and the duration of the successive higher levels are each determined by the interval between the pulses of a successive lower order decade.

Due to the fact that the anode voltages of the counter require a finite time to change from low to high (and vice versa) the pedestals of the multi-level output voltage from the selector switches are not altogether of square wave form. Thus if the high frequency pedestal of the input stage has disappeared before some or all of the pedestals produced by the other decades have reached their maximum amplitude, such high frequency pedestal will ride on the side of the pedestals from the other decades and the selected count may not be registered in the output circuit.

It is the principal object of the present invention to provide an improved coincidence indicator and method of operation whereby the possibility of an inaccurate indication of the selected count is avoided.

The invention will be better understood from the following description considered in connection with the accompanying drawings and its scope is indicated by the appended claims.

Referring to the drawings.

Figure 6:
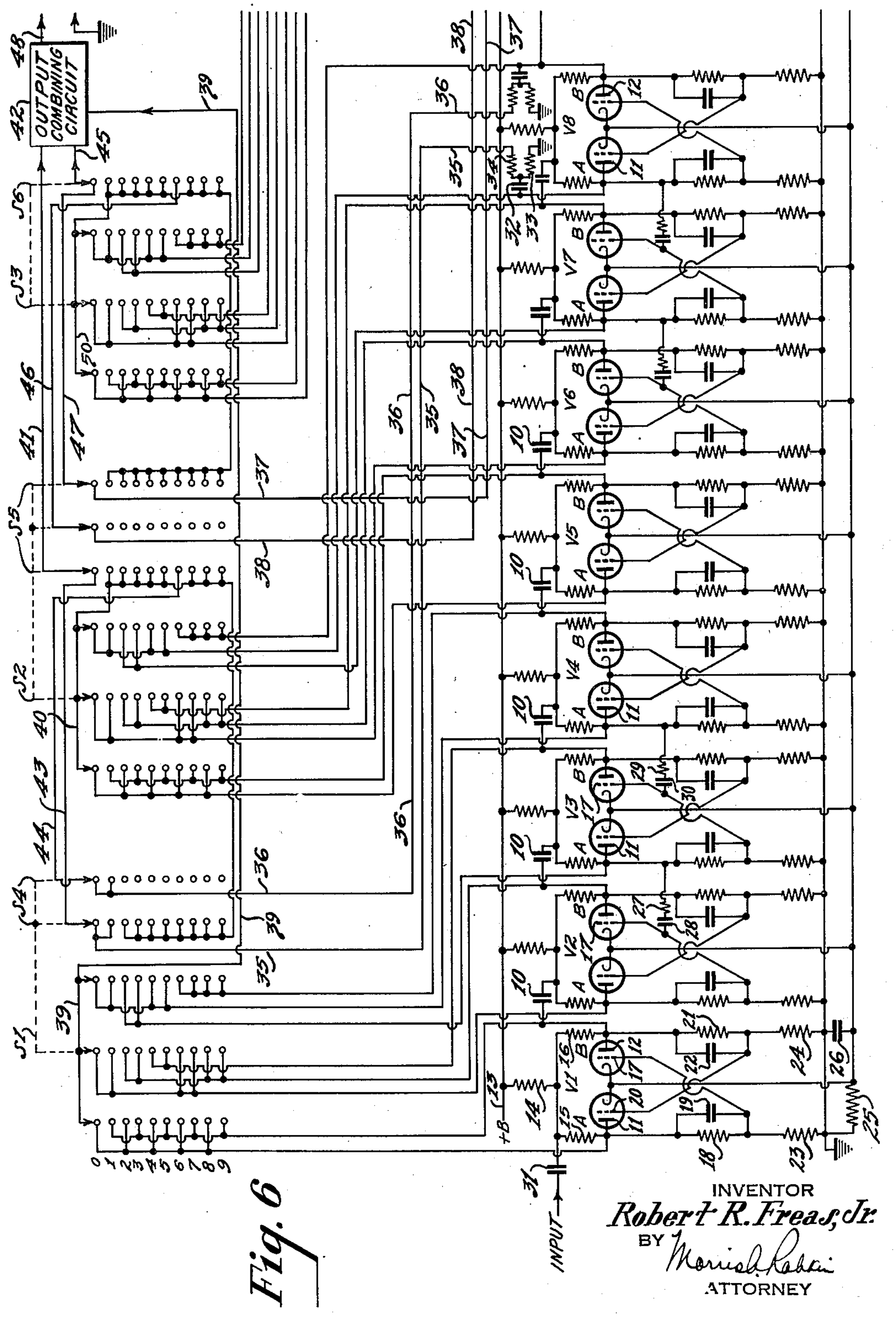
Figure 6 is a wiring diagram of the improved coincidence counter.
Figure 6A:
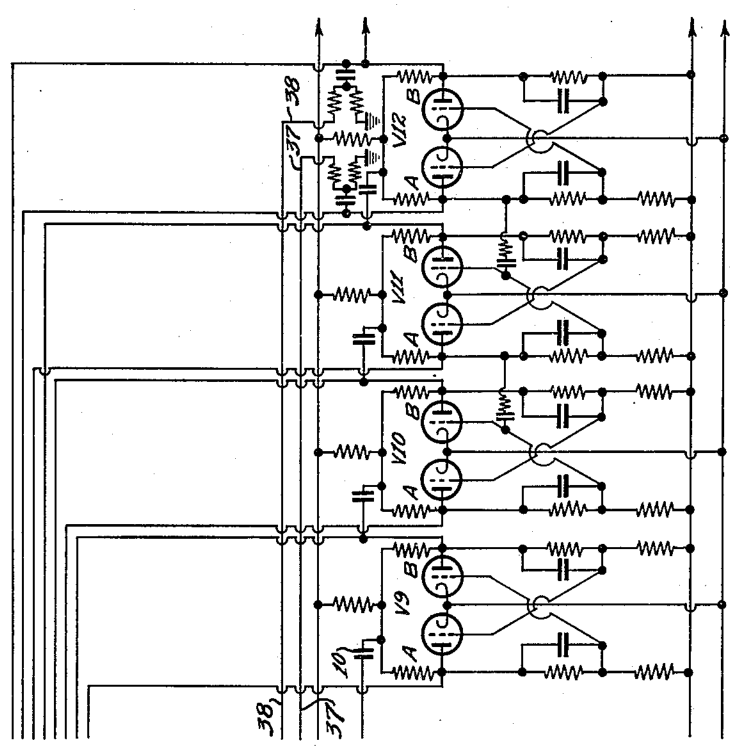

The wiring diagram of Figure 6 shows a counter including stages V1 to V12 which are connected in tandem through the medium of coupling capacitors 10. Each of these stages includes a pair of triodes A and B which have operating potential applied to their anodes 11 and 12 from $a+b$ lead 13 through a common resistor 14 and separate resistors 15 and 16. The anode 11 of the triode A is connected to the grid 17 of the triode B through a resistor 18 which is shunted by a capacitor 19. The anode 12 of the triode B is similarly connected to the grid 20 of the triode B through a resistor 21 which is shunted by a capacitor 22. The grids 17 and 20 are grounded respectively through a resistor 23 and through a resistor 24. Bias potential between the cathodes and grids of the various triodes is derived from a resistor 25 which is shunted by a bypass capacitor 26.

The entire counter includes three decades, the first of which consists of stages V1 to V4, the second of which consists of stages V5 to V8 and the third of which consists of stages V9 to V12. These three decades are similar. The first decade has one feedback circuit including a resistor 27 and a capacitor 28 connected between the anode 11 of stage V3 and the grid 17 of the stage V2 and another feedback circuit including a resistor 29 and a capacitor 30 connected between the anode 11 of the stage V4 and the grid 17 of the stage V3. With these connections, the application of ten pulses to the stage V1 through the counter input capacitor 31 produce one pulse at the input capacitor 10 of the stage V5, one hundred such input pulses produce one pulse at the input capacitor 10 of the stage V9 and one thousand such input pulses produce one pulse at the capacitor connected to the anode 12 of the stage V12.

Figure 1:
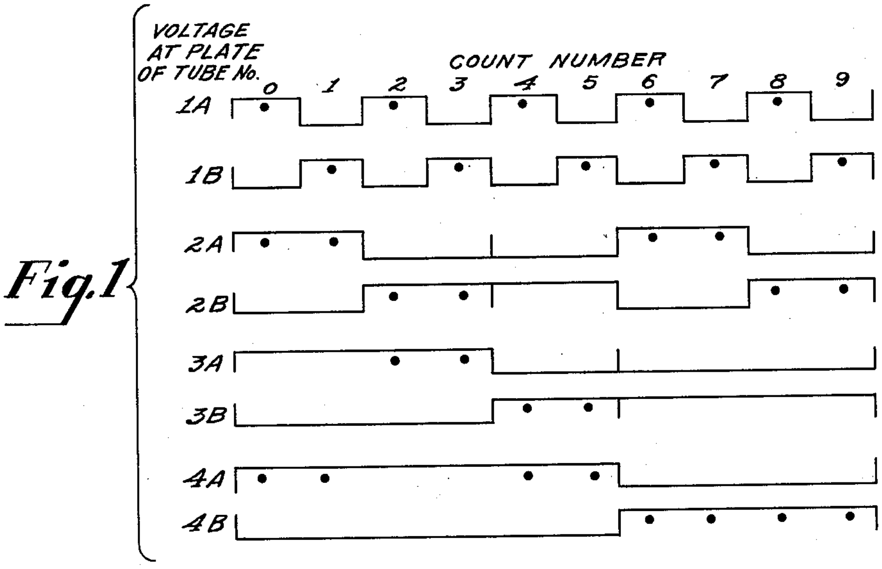
Figure 1 is an explanatory diagram indicating the different anode voltages of each decade which are selected to produce one output from the selector switch in response to a predetermined number of input pulses to the decade, such input pulses being indicated by the numerals 0 to 9 and the selected anodes being indicated by dots.

As in the case of the coincidence indicator of the copending application identified above, the anodes of the decade V1 to V4 are connected to the fixed contacts of a selector switch S1 in such a way that the counts indicated at the left of this switch are selected as the three movable contacts are brought into engagement with the successive horizontal rows of fixed contacts. That this result follows is readily checked by reference to Figure 1 wherein the selected number of impulses may be anything from 0 to 9 and wherein the three anode voltages positive for each count selected are indicated by dots. For example, if the selected count is 4, the "4" row of fixed contacts are connected to the anode 11 of stage V1, the anode 12 of stage V3 and the anode 11 of stage V4. The decade V5 to V8 is similarly connected to a count selector switch S2 and the decade V9 to V12 is similarly connected to a count selector switch S3.

Thus there is derived from the selector S3 a first voltage pulse of a duration equal to the interval between the pulses of the decade V9 to V12. From the selector switch S2 is derived a second voltage pulse which has a duration equal to the time interval between the pulses of the decade V5 to V8 and is to be superimposed on the first voltage pulse. From the selector switch S1 is derived a third voltage pulse which has a duration equal to the interval between the pulses of the decade V1 to V4 and is to be superimposed on the second pulse.

Figure 2:
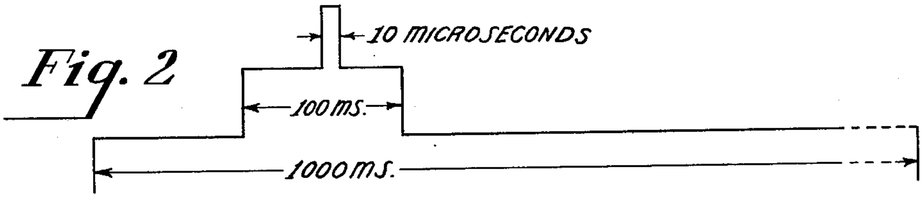
Figure 2 illustrates the ideal condition where the pedestals at the different levels is of the square wave form.
Figure 3:
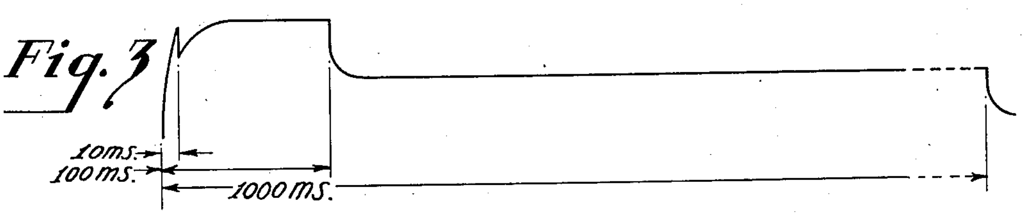
Figure 3 illustrates an actual condition where the pedestals are distorted from the ideal square wave form of Figure 2.

If these three voltage were of square wave form as indicated by Figure 2, the problem of combining them to produce a resultant voltage equal to the sum of their maximum values would be relatively simple. The actual condition encountered, however, is sometimes like that illustrated by Figure 3. Here the output pulse from the selector switch S1 is seen to ride on the sloping edge of pedestal so that its peak does not rise above the top of the pedestal sufficiently to provide the required indication.

This condition is most likely to occur when the count of 0 to 1 is selected on the highest frequency decade at the same time that the count of 0 or 6 is selected on the next decade in line: also, if 0 on the latter decade is selected with 0 or 6 on the following decade. The reason for this may be understood by referring to the counter waveforms of Figure 1. The dots under the count number indicate those plates will be connected to the coincidence indicator by the switches when the latter are set to the count number. It will be noted that, on all odd numbered counts (1, 3, 5, 7, and 9) only one plate of the selected three has been low voltage on the previous count. For counts 2, 4 and 8 two of the three plates were low voltage on the previous count. On counts 0 and 6, all three plates were low voltage on the previous count.

Because each plate takes a finite length of time to rise from low voltage to high voltage, it is obvious that when all three of the selected plates must do this, the distortion of the sum of these three voltages will be greatest. If the square wave from previous decade is placed on the first tenth of the 0 or 6 pedestal, it is necessary that the latter reach high voltage within the first $\frac{1}{10}$ of its width. This requirement is difficult in the case of high frequency counters. It can be met only by special counter circuits, which require a 50 percent increase in the number of vacuum tubes used, higher +B drain from the power supply, and the strict use of high frequency techniques in the handling of the square waves of the counter and coincidence indicator.

The present invention makes possible use of ordinary counters for high frequency operation and satisfactory coincidence indication by substituting special pedestal forming circuits for the regular pedestal circuits at the troublesome count combinations. These special circuits are very simple and reliable, and require no additional tubes.

Figure 4:
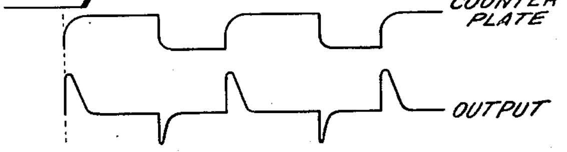
Figure 4 shows the wave form of the voltages at the anodes of the counter stages and the wave form produced by differentiating such voltages.
Figure 5:
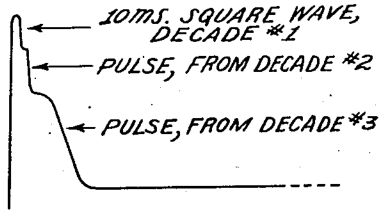
Figure 5 shows the type of coincidence voltage produced by the coincidence indicator of the present invention.

It will be noted that the start of the 0 and the 6 pedestal is the troublesome time in each decade. It will be noted also that, at the count of 0, one plate of the 4th stage of the decade is becoming high voltage, while at the count of 6, the other plate of the 4th stage is becoming high voltage. By connecting a differentiating network to each plate of the 4th stage, output pulses will be obtained whose amplitude at any instant is determined by the rate of rise of the plate voltage (Figure 4). Thus a higher voltage may be obtained across the differentiating network than appears at the impedance from the plate of the 4th stage. As this voltage soon becomes zero when the voltage at the plate is not changing, the differentiating network is useful only during the build up of the square wave, and switches must be used to select this output only when the first part of the pedestal is to be used. Voltage waveforms from the differentiating network are shown in Figure 4. Figure 5 illustrates the use of this pulse as a pedestal.

Such differentiating networks may each include a capacitor 32 having one of its terminals connected to the anode 11 of stage V8 and having its other terminal connected (1) through a resistor 33 to ground and (2) through a resistor 34 to a switch hereinafter described. Similar differentiating networks are provided at the anode 12 of the stage V8 and at the anodes 11 and 12 of the stage 12.

For controlling the outputs of the different differentiating networks there are provided a two point switch S4 which is ganged with the count selector switch S1, a three point switch S5 which is ganged with the count selector switch S2, and a one point switch S6 which is ganged with the count selector switch S3.

It will be noted that (1) the output lead 35 of the first differentiating network is connected to the first two fixed contacts at the left of the switch S4, (2) the output lead 36 of the second differentiating network is connected to the first two fixed contacts at the right of the switch S4, (3) the output lead 37 of the third differentiating network is connected to the first fixed contact in the third row of the fixed contacts of the switch S5, and (4) the output lead 38 of the fourth differentiating network is connected to the first fixed contact in the second row of fixed contacts of the switch S5.

With these connections, the sixth pulse applied to the decade V5 to V8 causes current conduction to go from the anode 12 to the anode 11 of V8 and a differentiated voltage pulse is applied through the lead 35 to the left hand "0" and "1" fixed contacts of the switch S4.

When the count of the decade V5 to V8 goes from 100 to zero a differentiated voltage pulse is applied through the lead 36 to the right hand fixed contacts "0" and "1" of the switch S4.

When the count of the decade V9 to V12 goes from 500 to 600, a differentiated voltage pulse is applied through the lead 37 to the right hand "0" contact of the switch S5.

When the count of the decade V9 to V12 goes from 1000 to zero, a differentiated voltage pulse is applied through the lead 38 to the middle "0" contact of the switch S5.

It will be noted that the common lead 39 of the switch S1 is connected to an output combining circuit 42 (such as that disclosed by the aforesaid copending application).

When the count of the decade V1 to V4 is "0" or "1" and the count of the decade V5 to V8 is 60 or 0, the maximum voltage applied to the lead 41, which is connected to the output combining circuit 42 may be insufficient to produce the desired result and is reinforced by the differentiated voltage pulses derived from the stage V8 through the leads 35 and 36, the "0" and "1" contacts of the switch S4, leads 43 and 44 and the left hand "0" and "6" fixed contacts of the switch S5.

The output lead 40 of the switch S2 is connected to the left hand contacts "1" to "5" and "7" to "9" of the switch S5 and to the left hand contacts "2" to "9" of the switch S4. The output lead 50 of the switch S3 is connected to the right hand contacts "1" to "9" of the switch S5 and to the right hand contacts "2" to "5" and "7" to "9" of the switch S6.

Another input lead 45 of the output combining circuit 42 is connected to the slides which cooperates with the right hand row of fixed contacts of the switch S6.

When the count of the decade V5 to V8 is zero and the count of the decade V9 to 12 is 600 or zero, the maximum voltage may be insufficient to produce the desired result and is reinforced by the differentiated pulses derived from the stage V12 through the leads 37 and 38, the middle and right hand "0" contacts of the switch S5, leads 46 and 47 and the right hand "0" and "6" contacts of the switch S6.

When the voltages of the leads 39, 41 and 45 have their maximum values, an output pulse is delivered at the output lead 48 of the output combining circuit 42. Thus any count within the counting range of the counter may be selected so as to produce one output pulse at the lead 48. Obviously the coincidence indicating system of the present invention may be extended to include additional decades.

What the invention provides is a coincidence indicator wherein differentiated voltages are provided at points where the normal anode voltages of the counter tend to be insufficient to produce a positive indication.

What is claimed is:

1. The combination of a plurality of decade counters connected in tandem and each including a plurality of trigger circuits of the type wherein a pair of electron discharge tubes have operating potential applied to their anodes through separate resistors and have their anodes each cross-connected to the grid of the other so that current conduction is stable in either of said tubes, means for applying input pulses to the lowest order of said decades, means for selecting from a first and second of said decades anode voltages which have their maximum values simultaneously only for one predetermined count of the decade from which they are selected, means for combining said selected voltages, a first differentiating circuit connected to the anode of one of the tubes in the fourth trigger circuit of a second of said decades, a second differentiating circuit connected to the anode of the other of the tubes in said fourth trigger circuit, switch means to apply the output of said first differentiating circuit to said means for combining said selective voltages responsive to said selecting means being adjusted to select a count of zero or one from said first decade and zero from said second decade, and a second switch means responsive to said selecting means being adjusted to select a count of zero or one from said first decade and six from said second decade to apply the output of said second differentiating network to said means for combining said selected voltages.

2. The combination of a plurality of decade counters connected in tandem and each including a plurality of trigger circuits of the type wherein a pair of electron discharge tubes have operating potential applied to their anodes through separate resistors and have their anodes each cross-connected to the grid of the other so that current conduction is stable in either of said tubes, means for applying input pulses to the lowest order of said decades, means for selecting from a first, second and third of said decades anode voltages which have their maximum values simultaneously only for one predetermined count of the decade from which they are selected, means for combining said selected anode voltages, a first differentiating circuit connected to the anode of one of the tubes in the fourth trigger circuit of a second of said decades, a second differentiating circuit connected to the anode of the other of said tubes in said fourth trigger circuit of said second decade, a third differentiating circuit connected to the anode of one of the tubes in the fourth trigger circuit of a third of said decades, a fourth differentiating circuit connected to the anode of the other tube in said fourth trigger circuit of said third decade, a first switch means to apply the output from said first differentiating circuit to said means for combining said selected voltages responsive to said selecting means being adjusted to select a count of zero or one from said first decade and zero from said second decade, a second switch means to apply the output from said second differentiating circuit to said means for combining said selected voltages responsive to said selecting means being adjusted to select a count of zero or one from said first decade and six from said second decade, a third switch means to apply the output from said third differentiating circuit to said means for combining said selected voltages responsive to said selecting means being adjusted to select a count of zero from said second decade and zero from said third decade, and a fourth switch means to apply the output from said fourth differentiating circuit to said means for combining said selected voltages responsive to said selecting means being adjusted to select a count of zero from said second decade and six from said third decade.

ROBERT RUSSELL FREAS, JR.

REFERENCES CITED

The following references are of record in the file of this patent:

UNITED STATES PATENTS

| Number | Name | Date |
|---|---|---|
| 2,422,698 | Miller | June 24, 1947 |

OTHER REFERENCES

Ultra High Frequency Techniques, Brainerd Van Nostrand Co., March 1944.